United States Patent [19]

Kawabata et al.

[11] Patent Number: 5,621,281
[45] Date of Patent: Apr. 15, 1997

[54] DISCHARGE LAMP LIGHTING DEVICE

[75] Inventors: Kenji Kawabata, Tokyo; Ryuichi Ikeda; Motohiro Sugino, both of Kanagawa-ken; Takashi Okada, Tokyo; Johji Mamiya, Kanagawa-ken, all of Japan

[73] Assignees: International Business Machines Corporation, Armonk, N.Y.; Hitachi, Ltd., Tokyo, Japan

[21] Appl. No.: 461,817

[22] Filed: Jun. 5, 1995

[30] Foreign Application Priority Data

Aug. 3, 1994 [JP] Japan ................................ 6-182064

[51] Int. Cl.⁶ .................................................. G05F 1/00
[52] U.S. Cl. ...................... 315/311; 315/307; 315/209 R; 315/224; 315/226
[58] Field of Search ....................... 315/307, 209 R, 315/224, 226, 175, 127, DIG. 5, DIG. 2, 311

[56] References Cited

U.S. PATENT DOCUMENTS

| | | | |
|---|---|---|---|
| 4,700,113 | 10/1987 | Stupp et al. | 315/224 |
| 4,775,821 | 10/1988 | Sikora | 315/219 |
| 4,816,720 | 3/1989 | Nomoto et al. | 315/94 |
| 4,928,037 | 5/1990 | Kawabata et al. | 315/127 |
| 5,066,894 | 11/1991 | Klier | 315/224 |
| 5,166,579 | 11/1992 | Kawabata et al. | 315/209 R |
| 5,384,516 | 1/1995 | Kawabata et al. | 315/160 |

FOREIGN PATENT DOCUMENTS 5-80191   5/1993   Japan .

*Primary Examiner*—Robert Pascal
*Assistant Examiner*—Haissa Philogene
*Attorney, Agent, or Firm*—Sixbey Friedman Leedom & Ferguson; Thomas W. Cole

[57] ABSTRACT

A current feedback type discharge lamp lighting device including a switching circuit which switches an impedance of an impedance device in accordance with the number of connected discharge tubes. In the discharge lamp lighting device, a tube current for each of the connected discharge tubes is maintained constant, and the discharge lamp lighting device tends to not be effected by stray capacitance.

9 Claims, 2 Drawing Sheets

DISCHARGE LAMP LIGHTING DEVICE

BACKGROUND OF THE INVENTION

1. Field of the Invention

The present invention relates to a discharge lamp lighting device which lights discharge tubes while maintaining constant the respective tube currents of an arbitrary number of discharge tubes.

2. Description of the Related Art

A conventional discharge lamp lighting device which maintains tube current constant is disclosed in Japanese Utility Model Application Laid-Open No. 5-80191. In the discharge lamp lighting device disclosed in this publication, a tube current detected at a tube current detecting circuit is fed-back to a voltage control means provided so as to precede to a lighting circuit. The voltage control means is operated so that the tube current flowing through the discharge tube is constant, and lighting voltage is supplied to the lighting circuit. In the tube current detecting circuit, usually, the tube current flows through a resistor, and the circuit outputs the voltage generated across both ends of the resistor. Such a discharge lamp lighting device is generally called a current feedback type lighting device. In a liquid crystal backlight which uses a cold cathode discharge tube having an extremely small diameter and relatively high impedance as a light source, drawbacks arise in that the startability deteriorates and characteristics tend to fluctuate due to the effect of stray which occurs because a metal reflecting film is near a periphery of the discharge tube. These drawbacks tend not to arise in a current feedback type lighting device which provides a lit state in which the startability and characteristics are stable.

However, in the above-described conventional art, in a case in which the number of discharge tubes is varied arbitrarily, a current of a value which is the sum total of the currents flowing through the plurality of discharge tubes flows to the resistor of the tube current detecting circuit. Therefore, when an attempt is made to keep the voltage across both ends of the resistor constant, a drawback arises in that the current flowing per discharge tube varies. Further, if a source of current, a lighting circuit, a tube current detecting circuit or the like are provided respectively for each of the discharge tubes, the respective tube currents are held constant even if the number of discharge tubes is varied arbitrarily, but the lighting device becomes large, complex, and more expensive.

SUMMARY OF THE INVENTION

An object of the present invention is to provide, at minimum cost and minimum size, a current feedback type discharge lamp lighting device in which the number of discharge tubes can be changed arbitrarily and which tends not to be effected by stray capacitance.

The aforementioned object may be achieved by providing a discharge lamp lighting device, which has a lighting circuit which flows current to a discharge tube connected to a direct current power supply so as to maintain a lit state of the discharge tube and has a voltage control circuit which flows, to an impedance device, current flowing through the discharge tube and controls voltage supplied to the lighting circuit so that current flowing through the impedance device is maintained constant, with a switching circuit which flows, to one impedance device, all or a portion of current flowing through one discharge tube or a plurality of discharge tubes, the switching circuit varying the impedance of the impedance device in accordance with the number of discharge tubes. The object may also be achieved by the lighting circuit being one lighting circuit or a plurality of lighting circuits, and the current flowing through the impedance device being all or a portion of respective currents flowing through discharge tubes connected to the one lighting circuit or a plurality of lighting circuits.

The above-described object may be achieved by the voltage supplied to the lighting circuits being controlled by receiving feedback signals from each of the lighting circuits and varying the impedance of the impedance device. The object may also be achieved by the number of discharge tubes being detected by opening/closing of the impedance switching circuit which operates due to input of feedback signals outputted from each of the lighting circuits.

Alternatively, the object may be achieved by the impedance device being structured by a plurality of resistors being connected, and in a case in which the plurality of resistors are connected in series, a switching element is connected in parallel to each of the resistors, and in a case in which the plurality of resistors are connected in parallel, a switching element is connected in series to each of the resistors, and the switching circuit varies the impedance of the impedance device by opening/closing the switching elements connected in one of in series and in parallel to the plurality of resistors. The object may also be achieved by the impedance of the impedance device in a case in which there is one discharge tube being N times the impedance in a case in which there are N discharge tubes.

The aforementioned object may also be achieved by the voltage control circuit being structured by a chopping circuit, which is connected in series to the direct current power supply, and a signal generating circuit, which generates an opening/closing control signal of the chopping circuit, the voltage control circuit controlling the voltage supplied to the lighting circuit by duty control of the chopping circuit, and operating so as to maintain current flowing to the impedance device constant, and effecting opening/closing control of one chopping circuit or a plurality of chopping circuits by one output signal of the signal generating circuit.

The switching of the impedance for the tube current detecting device is effected by connecting a plurality of resistors in series, connecting switches of, for example, transistors in parallel to both ends of each resistor, and varying the closed switches in accordance with the number of detected lighting circuits.

The current feedback type discharge lamp lighting device is basically structured to control the voltage inputted to the lighting circuits so that the voltage across both ends of the tube current detecting circuit is uniform. Accordingly, in the present invention, the voltage inputted to the lighting circuits is controlled by switching the impedance of the tube current detecting circuit in accordance with the number of discharge tubes.

Given that the impedance of the tube current detecting circuit when there is one discharge tube is R, the impedance of the tube current detecting circuit is R/N when there are N discharge tubes. For example, in a case in which a current I flows through the discharge tube, when there is one discharge tube, the voltage across both ends of the tube current detecting circuit is I×R. When there are N discharge tubes, the sum total of the current flowing through the respective discharge tubes flows through the tube current detecting circuit. Therefore, the voltage across both ends of the tube current detecting circuit is (N×I) ×(R×N), and when there is one discharge tube, the voltage is I×R. Accordingly, by switching the impedance of the tube current detecting circuit in accordance with the number of lighting circuits, a uniform current I can be made to flow to the discharge tubes regardless of the number thereof.

The number of lighting circuits is detected in the following manner. First, the respective discharge tubes are lit at the lighting devices, each of which converts one direct current source into an alternating current source, raises the voltage, and supplies tube current to a discharge tube. These current feedback type lighting devices control the input voltage such that, as described above, the voltage across both ends of the tube current detecting circuit is uniform. Therefore, inputted feedback signals are received from the lighting devices, and the number of signal wires carrying feedback signals is calculated. In this way, the number of lighting circuits can be known. The switching of the impedance of the tube current detecting device can be realized as follows: a plurality of resistors are connected in series; the switches of, for example, transistors are connected in parallel to both of the ends of the respective resistors; and the closed switches are varied in accordance with the number of discharge tubes detected at a lamp number detecting circuit.

The discharge lamp lighting device in accordance with the present invention has a lighting circuit which flows current to a discharge tube connected to a direct current power supply so as to maintain a lit state of the discharge tube, and has a voltage control circuit which flows, to an impedance device, current flowing through the discharge tube, and controls voltage supplied to the lighting circuit so that current flowing through the impedance device is maintained constant. The discharge lamp lighting device is provided with a switching circuit which flows, to one impedance device, all or a portion of current flowing through one discharge tube or a plurality of discharge tubes, the switching circuit varying the impedance of the impedance device in accordance with the number of discharge tubes. In this way, even if the number of discharge tubes or lighting circuits is arbitrarily varied within a preset range, a current feedback type discharge lamp lighting device can be realized in which the tube current flowing per discharge tube is automatically held constant, and which tends not to be effected by stray. Further, because the number of transformers varies in accordance with the number of discharge tubes, even if there are only a few connected discharge tubes, there is no need to utilize a transformer which is larger than needed, and the lighting device can be made compact and inexpensive.

DESCRIPTION OF THE PREFERRED EMBODIMENT

Figure 1:
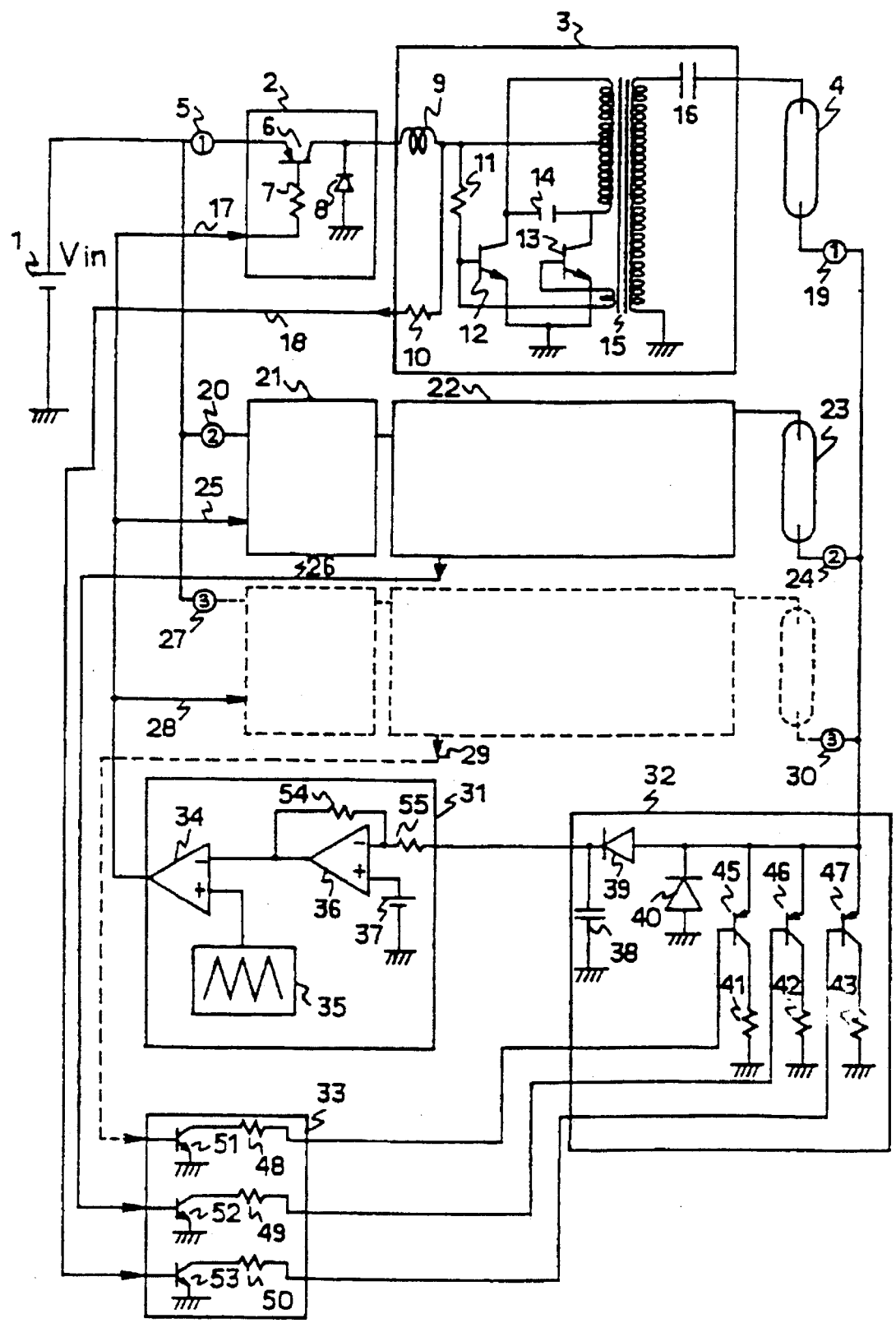
FIG. 1 is a circuit view illustrating an embodiment of a discharge lamp lighting device.
Figure 2:
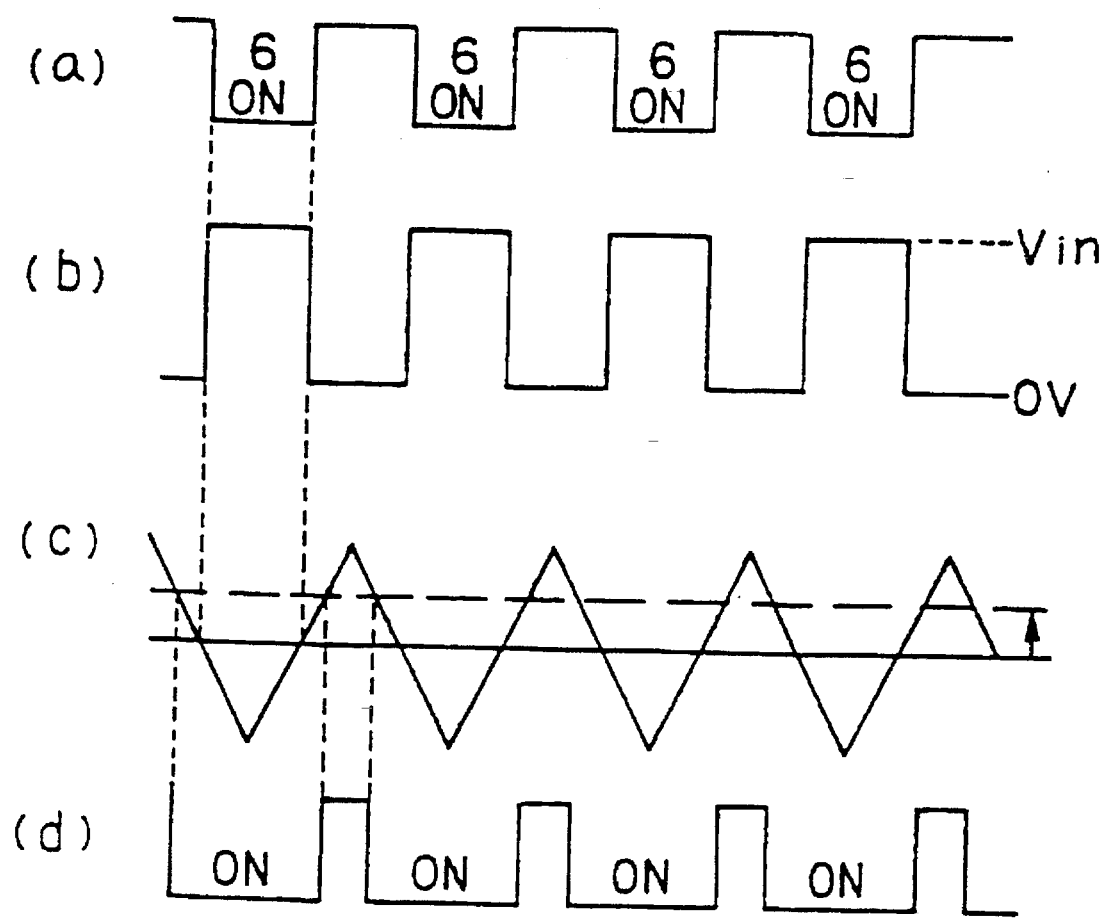
FIG. 2 is view for explaining operation of the present embodiment.

An embodiment of the present invention and the accompanying drawings will now be described. FIG. 1 is a circuit view illustrating an embodiment of a discharge lamp lighting device of the present invention, and FIG. 2 is a view for explaining operation of the embodiment. The embodiment of the present invention shown in FIG. 1 illustrates a state in which, with one lighting circuit provided per discharge tube, two discharge tubes (two lighting circuits) are connected at a discharge lamp lighting device which is structured such that an arbitrary number of lighting circuits up to three lighting circuits can be connected thereto. The portion illustrated by the broken line in the drawing illustrates a state in which the remaining one discharge tube and its lighting circuit are connected.

In the figures, reference numeral 1 is direct current power supply, and 2 is a chopping circuit formed by a chopping transistor 6, a base resistor 7, and a diode 8. Reference numeral 3 is a lighting circuit of a discharge tube which is formed by a choke coil 9, a resistor 10, a base resistor 11, oscillating transistors 12 and 13, a resonant capacitor 14, a transformer 15, and a ballast capacitor 16. Reference numeral 4 is a discharge tube, 5 is a power supply terminal, 17 is a control signal which controls the operation of the chopping circuit 2, 18 is a feedback signal wire which feeds-back the voltage inputted to the lighting circuit 3, 19 is a tube current detecting terminal for detecting tube current, and 26, 29 are feedback signal wires. Further, reference numeral 31 is an operation signal generator of the chopping circuit 2 and is formed by a voltage comparator 34, a reference chopping wave generator 35, an error amplifier 36, a reference voltage supply 37, and resistors 54, 55. Reference numeral 32 is a tube current detector formed by tube current detection resistors 41, 42, 43, transistors 45, 46, 47, diodes 39, 40, and a capacitor 38. Impedance switching signal generator 33 is formed by resistors 48, 49, 50 and transistors 51, 52, 53.

Next, operation of the present embodiment will be described. First, description will be given of operation in a case in which the remaining one discharge tube illustrated by the broken lines is not connected. Direct current voltage is supplied from the direct current power supply 1 to the chopping circuits 2, 21 via the power supply terminals 5, 20. In this example, because the third discharge tube is not connected as mentioned above, the power supply terminal 27 is open. The chopping circuits 2, 21 chop the supplied direct current voltage in accordance with an operation signal inputted from the operation signal generator 31. These waveforms are illustrated in FIG. 2. In FIG. 2, (a) illustrates the operation signal waveform inputted from the operation signal generator 31, and (b) shows the output voltage waveform of the chopping circuits 2, 21. The lighting circuit 3 is a so-called push-pull type voltage resonance circuit and turns the oscillating transistors 12, 13 on and off alternately and generates alternating current voltage in the primary winding of the transformer 15. Resonance current flows between the primary winding of the transformer 15 and resonant capacitor 14 and sine-wave oscillation is effected. By raising the voltage at the transformer 15 and applying high frequency high voltage to the discharge tube 4 via the ballast capacitor 16, the discharge tube 4 is lit, and its lit state is maintained. A discontinuous voltage waveform such as that illustrated in FIG. 2(b) is inputted to the lighting circuit 3, but due to the smoothing effect of the choke coil 9, a continuous tube current is supplied to the discharge tube 4. FIG. 2(c) illustrates the tube current waveform of the discharge tube 4. The same operations as those described above are carried out for the lighting circuit 22 and the discharge tube 23.

Next, operation of the impedance switching signal generator 33 will be described. When the voltage illustrated in FIG. 2(b) is applied to the lighting circuit 3, voltage is fed-back from the lighting circuit 3 via the resistor 10 and the feedback signal wire 18, and the transistor 53 of the impedance switching signal generator 33 is turned on. In the same way, when the voltage illustrated in FIG. 2(b) is applied to the lighting circuit 22, voltage is fed-back from the lighting circuit 22 via the feedback signal wire 26, and the transistor 52 is turned on. However, because the power supply terminal 27 and the feedback signal wire 29 are not connected, voltage is not fed-back, and the transistor 51 is not turned on. When the transistors 52, 53 of the impedance switching signal generator 33 are turned on, base current flows via the resistors 49, 50, and the transistors 46, 47 of the tube current detector 32 are turned on. The transistor 45 remains off. If the values of resistance of the resistors 41, 42, 43 are respectively R ohms, the combined resistance becomes R/2 ohms when the transistors 46, 47 are turned on.

When current of I amperes flows through the discharge tubes 4, 23 respectively, a current of a total of 2I amperes flows through the combined resistance R/2. Therefore, the voltage generated across both ends of the tube current detection resistor is IR volts. Because the tube current is alternating current, a direct current voltage rectified by the diodes 39, 40 and smoothed at the capacitor 38 is input to the operation signal generator 31. A voltage, which is proportional to a difference voltage between the inputted direct current voltage and the voltage $V_{ref}$ of the reference voltage supply 37, is outputted from the error amplifier 36 and inputted to the voltage comparator 34. The voltage comparator 34 compares the inputted voltage and the output voltage of the reference chopping wave generator 35, and outputs the waveform illustrated in FIG. 2(*a*). In FIG. 2, (*c*) illustrates the output voltage waveform of the reference chopping wave generator 35 and the direct current voltage waveform (solid line) inputted to the voltage comparator 34 from the error amplifier 36.

For example, if for some reason the tube current decreases, the voltage across both ends of the tube current detection resistor decreases, and the voltage inputted to the error amplifier 36 decreases. Because the error amplifier 36 is an inverting amplifier, when the voltage inputted to the error amplifier 36 decreases, the output voltage thereof increases. The broken line in FIG. 2(*c*) is the waveform of the direct current voltage inputted to the voltage comparator 34 from the error amplifier 36 at this time. Accordingly, the output voltage waveform of the voltage comparator 34 becomes a waveform such as that illustrated in FIG. 2(*d*). In the waveforms of FIG. 2(*a*) and FIG. 2(*d*), the chopping transistors of the chopping circuits 2, 21 are on while the voltage is low. As illustrated in FIG. 2(*d*), when the tube current decreases, the period of time that the voltage is low increases. Therefore, the time over which the chopping transistors of the chopping circuits 2, 21 are on increases. As a result, the voltage applied to the lighting circuits 3, 22 increases so as to increase the tube current. The above-described feedback is effected so that the difference voltage between the voltage inputted to the error amplifier 36 and the voltage $V_{ref}$ of the reference voltage supply 37 becomes substantially zero. Therefore, the tube current is held constant. The above description is applicable as well to a case in which the tube current increases for some reason.

If the third discharge tube illustrated by the broken line in FIG. 1 is connected, current of 3I amperes flows through the tube current detection resistors. In this case, because the transistors 51, 45 are on, the combined resistance of the tube current detection resistors 41, 42, 43 is R/3 ohms, and the voltage across both ends of the current detection resistor is IR volts. As a result, current of I amperes flows through each discharge tube in the same way as the above-described case in which there are two discharge tubes. Accordingly, a current feedback type discharge lamp lighting device can be realized in which the tube current flowing through each discharge tube can automatically be held constant even if discharge tubes are connected to an arbitrary number of circuits which is less than or equal to the number of lighting circuits set in advance.

In the embodiment illustrated in FIG. 1, the circuit is structured such that up to three discharge tubes can be connected. However, the structure of the present invention can be made applicable to any arbitrary number of discharge tubes by increasing the number of power supply terminals, control signal wires, feedback signal wires, tube current detection terminals, tube current detection resistors and transistors within the tube current detector 32, and transistors and resistors within the impedance switching signal generator 33.

What is claimed is:

1. A discharge lamp lighting device comprising:

a lighting circuit which is connected to a direct current power supply and flows current to one discharge tube or a plurality of discharge tubes so as to maintain a lit state of the discharge tube or tubes;

one impedance device which is connected to the discharge tube or tubes so that all or a portion of current flowing through the discharge tube or tubes flows in the impedance device;

a voltage control circuit which controls voltage supplied to said lighting circuit so that voltage applied to the impedance device is maintained constant; and a switching circuit for varying the impedance of the impedance device in accordance with the number of lighting circuits.

2. A discharge lamp lighting device according to claim 1, wherein said lighting circuit is one lighting circuit or a plurality of lighting circuits, and the current flowing through the impedance device is all or a portion of respective currents flowing through discharge tubes connected to said one lighting circuit or a plurality of lighting circuits.

3. A discharge lamp lighting device according to claim 1, wherein the voltage supplied to said lighting circuits is controlled by receiving feedback signals from each of said lighting circuits and varying the impedance of the impedance device.

4. A discharge lamp lighting device according to claim 1, wherein the number of discharge tubes is detected by opening/closing of said impedance switching circuit which operates due to input of feedback signals outputted from cacti of said lighting circuits.

5. A discharge lamp lighting device according to claim 1, wherein the impedance device is structured by a plurality of resistors and a plurality of switching elements connected to said plurality of resistors, and said switching circuit varies the impedance of the impedance device by opening/closing the switching elements.

6. A discharge lamp lighting device according to claim 1, wherein the impedance of the impedance device is inversely proportional to a sum total of currents flowing through the respective discharge tubes.

7. A discharge lamp lighting device according to claim 1, wherein the impedance of the impedance device in a case in which there is one discharge tube is N times the impedance in a case in which there are N discharge tubes.

8. A discharge lamp lighting device according to claim 1, wherein said voltage control circuit is structured by a chopping circuit, which is connected in series to the direct current power supply, and a signal generating circuit, which generates an opening/closing control signal of said chopping circuit, said voltage control circuit controlling the voltage supplied to said lighting circuit by duty control of said chopping circuit, and operating so as to maintain voltage supplied to the impedance device constant, and effecting opening/closing control of one chopping circuit or a plurality of chopping circuits by one output signal of said signal generating circuit.

9. A discharge lamp lighting device according to claim 8, wherein said signal generating circuit is formed from an inverting amplifier which, when current flowing through the discharge tube decreases, increases a period of time said chopping circuit is open so as to increase the current.

* * * * *